(12) United States Patent
Bosiers et al.

(10) Patent No.: US 8,915,643 B2
(45) Date of Patent: Dec. 23, 2014

(54) DYNAMIC MIXING PUMP

(71) Applicant: Styron Europe GmbH, Horgen (CH)

(72) Inventors: Luc Bosiers, Edegem (BE); Rodolfo Salmang-Frohard, Terneuzen (NL)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 14/294,541

(22) Filed: Jun. 3, 2014

(65) Prior Publication Data

US 2014/0286121 A1  Sep. 25, 2014

Related U.S. Application Data

(63) Continuation of application No. PCT/EP2011/072889, filed on Dec. 15, 2011.

(51) Int. Cl.
| | | |
|---|---|---|
| *B29B 7/46* | (2006.01) | |
| *B01F 7/00* | (2006.01) | |
| *B29B 7/42* | (2006.01) | |
| *B29B 7/60* | (2006.01) | |
| *B29B 7/94* | (2006.01) | |
| *B29C 47/36* | (2006.01) | |
| *B29C 47/54* | (2006.01) | |
| *B29C 47/60* | (2006.01) | |

(52) U.S. Cl.
CPC .............. *B29B 7/46* (2013.01); *B01F 7/00708* (2013.01); *B29B 7/426* (2013.01); *B29B 7/60* (2013.01); *B29B 7/94* (2013.01); *B29C 47/364* (2013.01); *B29C 47/366* (2013.01); *B29C 47/54* (2013.01); *B29C 47/6093* (2013.01)
USPC ....................................... 366/144; 366/153.3

(58) Field of Classification Search
USPC ............................................... 366/144, 153.3
See application file for complete search history.

(56) References Cited

U.S. PATENT DOCUMENTS

| | | |
|---|---|---|
| 3,740,025 A | 6/1973 | Ruf |
| 3,764,238 A | 10/1973 | Carpigiani |
| 4,025,056 A | 5/1977 | Miles et al. |
| 4,200,207 A | 4/1980 | Akers et al. |
| 4,289,409 A * | 9/1981 | Brand .............................. 366/83 |

(Continued)

FOREIGN PATENT DOCUMENTS

| | | |
|---|---|---|
| DE | 1782117 A1 | 7/1971 |
| DE | 102005050619 A1 | 4/2007 |

(Continued)

OTHER PUBLICATIONS

Search Report and Written Opinion for Application No. PCT/EP2011/072889 dated Oct. 9, 2012, 10 pages.

*Primary Examiner* — Tony G Soohoo
(74) *Attorney, Agent, or Firm* — The Dobrusin Law Firm, PC

(57) ABSTRACT

Apparatus (1) for admixing additives to a medium to be pumped, comprising at least one gear pump (2) for pumping a medium to be pumped, said gear pump (2) comprising at least one shaft (3) having a first driving torque; at least one injector (5) for introducing an additive into a medium to be pumped; at least one screw conveyor (6) for mixing said additive with said medium to be pumped, said screw conveyor having a second driving torque, and, characterized in that, the shaft (3) and the screw conveyor (6) are functionally connected, such that the first driving torque and the second driving torque are coupled.

16 Claims, 10 Drawing Sheets

(56) References Cited

U.S. PATENT DOCUMENTS

| | | | |
|---|---|---|---|
| 4,336,213 A * | 6/1982 | Fox | 264/40.1 |
| 4,385,883 A * | 5/1983 | Hanslik | 425/204 |
| 4,396,529 A | 8/1983 | Price et al. | |
| 4,436,679 A | 3/1984 | Winstead | |
| 4,452,750 A * | 6/1984 | Handwerk et al. | 264/40.3 |
| 4,601,645 A | 7/1986 | Schmitkons | |
| 4,707,139 A * | 11/1987 | Valenzky et al. | 366/77 |
| 5,129,728 A | 7/1992 | Winstead | |
| 5,156,794 A * | 10/1992 | Nakanishi et al. | 264/349 |
| 5,458,474 A * | 10/1995 | Neubauer et al. | 425/202 |
| 5,866,053 A | 2/1999 | Park et al. | |
| 5,958,164 A | 9/1999 | Ishiwatari et al. | |
| 6,005,013 A | 12/1999 | Suh et al. | |
| 6,231,742 B1 | 5/2001 | Blizard et al. | |
| 6,402,360 B1 * | 6/2002 | Nortey | 366/85 |
| 6,602,064 B1 | 8/2003 | Chen et al. | |
| 8,066,423 B2 * | 11/2011 | Neubauer | 366/77 |
| 8,388,216 B2 * | 3/2013 | Lechner et al. | 366/75 |
| 2001/0000930 A1 | 5/2001 | Kim | |
| 2001/0018121 A1 | 8/2001 | Okamoto et al. | |
| 2001/0047042 A1 | 11/2001 | Anderson et al. | |
| 2002/0006975 A1 | 1/2002 | Welsh et al. | |
| 2002/0041807 A1 | 4/2002 | Forthuber et al. | |
| 2002/0147245 A1 | 10/2002 | Kim et al. | |
| 2002/0163098 A1 | 11/2002 | Sakamoto et al. | |
| 2004/0009076 A1 | 1/2004 | Uphus | |
| 2004/0022996 A1 | 2/2004 | Jenkins | |
| 2007/0109911 A1 * | 5/2007 | Neubauer | 366/77 |
| 2008/0197209 A1 | 8/2008 | Ganzer | |
| 2009/0148665 A1 | 6/2009 | Thiagarajan et al. | |
| 2010/0043906 A1 | 2/2010 | Jackson et al. | |
| 2011/0085408 A1 * | 4/2011 | Neubauer | 366/77 |
| 2011/0182132 A1 * | 7/2011 | Lechner et al. | 366/76.6 |
| 2014/0286121 A1 * | 9/2014 | Bosiers et al. | 366/144 |

FOREIGN PATENT DOCUMENTS

| | | |
|---|---|---|
| EP | 463759 A2 | 1/1992 |
| EP | 1268624 B1 | 1/2003 |
| EP | 2103411 A1 | 9/2009 |
| EP | 2103477 A9 | 9/2009 |
| WO | 01/36521 A2 | 5/2001 |
| WO | 01/41995 A1 | 6/2001 |
| WO | 2008/141766 A1 | 11/2008 |

* cited by examiner

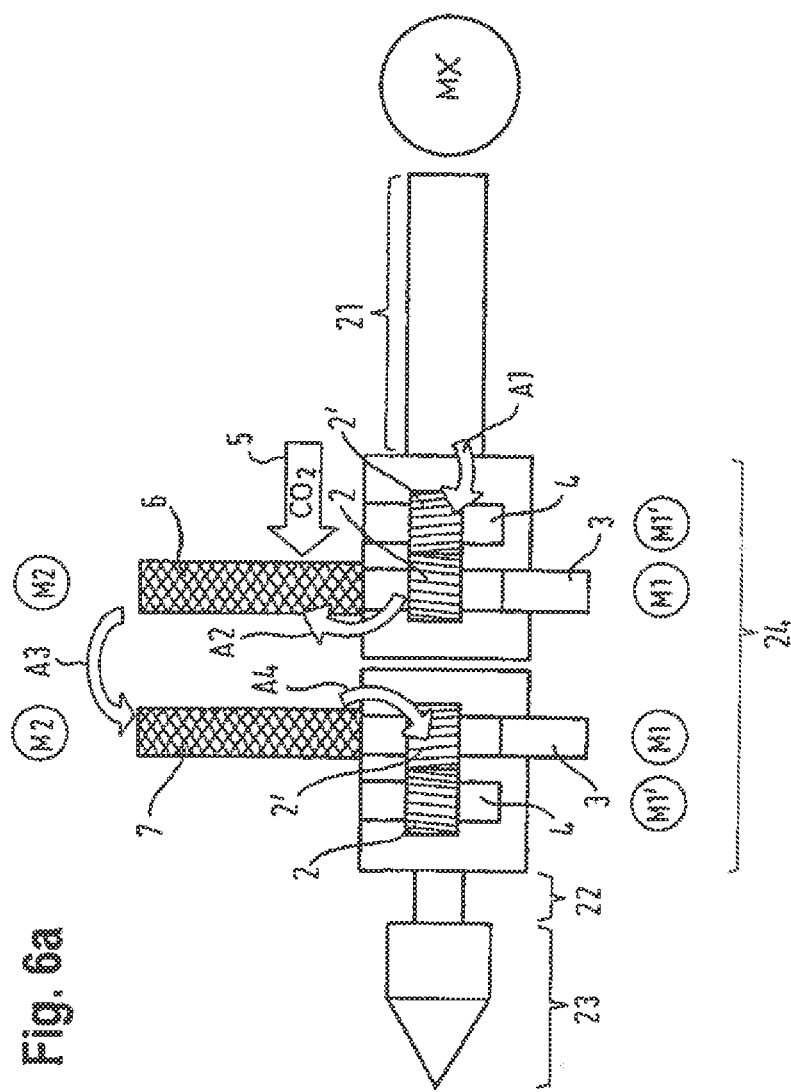

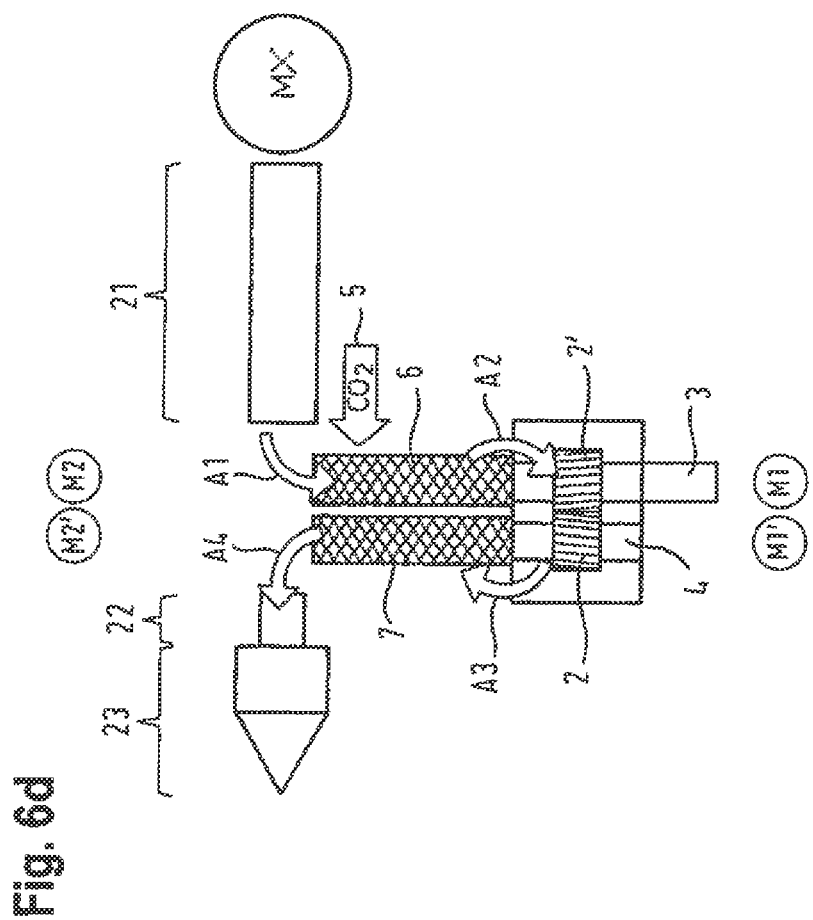

DYNAMIC MIXING PUMP

CLAIM OF PRIORITY

This application is a continuation of serial number PCT/EP2011/072889, filed on 15 Dec. 2011, which is hereby entirely incorporated by reference for all purposes in its entirety.

The present invention relates to an apparatus for admixing additives to a medium to be pumped.

Various technologies to mix two or more high viscous and/or low viscous materials exist today, including the use of single or twin-screw extrusion systems or a combination of an injection system and a static mixer.

Mixing viscous materials in an extruder has several drawbacks, including the need to design and install a screw of adequate design to obtain proper mixing. Another drawback is the time required to purge the extruder at a change-over from one set of materials to a different set of materials due to the size and length of the screw. To ensure proper mixing, the screw must be sufficiently long but this means that more time is needed and material is wasted when purging the screw. Also, in certain cases, the relatively long residence time in the extruder may be undesired for certain materials.

In some cases, an additive can be metered into the melt stream of an extruder by for example, a liquid dosing equipment. This requires the construction of a melt channel through the barrel of the extruder. However, this is not practical when trying to upgrade existing equipment.

Retrofitting an existing extruder would be a complex and costly effort with significant loss of machine operation time.

In still other situations, a vented extruder is used. The design of the extruder and its screw are often such that it is not practical to ensure proper injection and mixing of the additive stream whilst continuing to operate with an active vent system. On the other hand, the vent needs to remain operational for the extraction of undesirable volatiles (e.g. air, moisture, oligomers, etc).

Some systems exist in which an additive stream is added downstream of the extruder. For example, such stream could be introduced in between the extruder and a static mixer. In some cases, however, them may not be enough floor space available to install a suitable injection system and a static mixer. Moreover, in some cases, e.g. when foaming agents are introduced, the high pressure drop caused by the static mixer is undesired.

In the field of plastic production, there is a need to improve, alter or enrich the properties of the plastics by adding additives to the melt. Another trend in the field of plastic processing is the extrusion of foamed plastics. A foaming can be achieved by adding a physical or chemical blowing agent (or a combination of the two) to the melt. It is important, that blowing agents as well as any additives to be added, such as for example nucleation agents, be distributed in the melt as homogenously as possible. Typically, physical blowing agents, such as $N_2$ or $CO_2$ are added with pressures well above 75 bar at 20° C. (in a fluid condition, e.g. supercritical fluid to guarantee mixing into a single phase). By doing so, the viscosity of the melt is reduced. Furthermore, the mixing leads to an undesired increase in temperature of the melt. For admixing additives as described, static mixers have been used. One disadvantage of these static mixers is the comparatively large area they occupy by requiring a longitude in the direction of the extrusion. Often it becomes impossible to retrofit an installation to comprise static mixers due to space restrictions in the extrusion direction. Static mixers also take a considerable pressure drop which becomes a limiting factor in many processes. Also, higher pressures upstream of the static mixers pose a risk of collapsing the mixing elements. Some extruders may not be capable of building up these higher pressures upstream.

Furthermore, it is important that a high decrease in pressure happens at the exit of the extrusion tool to achieve the desirable nucleation and controlled cell expansion. In the case of static mixers, the pressure is consumed when the melt passes the mixers. Often this results in too low pressures at the exit of the extrusion tool. This results in an irregular foaming of the product.

A further feature of using extruders with static mixers is the adjustment and coupling of the probes steps through the torque of the conveyor shafts.

EP 1 266 624 B1 describes an extrusion line used for extruding particular foams with use of a physical blowing agent. The resin and an optional nucleator are fed into an extruder with a mixing head, static mixers, a gear pump and a die. A physical blowing agent is injected through an injection valve of the extruder. The finally resulting foam sheet is pulled and compressed and wound to form a roll of foamed sheet. This device has the disadvantage of having large space requirement in the direction of extrusion by incorporating the two static mixers (IX) in the production line downstream of the extruder.

The use of dynamic mixers instead of static mixers is also known, but they all require a further drive for the dynamic mixers and the incorporation of the dynamic mixing process into the production line process is complicated and cumbersome.—(Michaeli W.; Hildebrand, T. Schumacher, H.; physikalisches Schäumen mit Standard Extruden; Kurststoffe November 2008; Karl Hanser Verlag, München)

It was an object of the present invention to overcome the disadvantages of the prior art. In particular, it was an object of the present invention to provide an apparatus that enables extrusion of a medium with a sufficiently homogenised additive being less complicated to install and maintain. A cost efficient, space and energy efficient, easy to use and reliable device for extruding plastics is provided, which achieves a high mixing performance and keeps the melt temperature controlled by additional heat removal.

This object is solved with an apparatus according to claim 1. Preferable embodiments are defined in the dependent claims as wall as the following description.

The apparatus according to the invention is for admixing additives to a medium to be pumped. In the context of the present invention, a medium to be pumped shall be construed as to comprise any material or substance processed by means of extrusion, such as e.g. plastics and other viscous or semi-viscous media. The apparatus according to the present invention comprises at least one gear pump for pumping the medium to be pumped. In the following, the at least one gear pump may as well be called first gear pump. A gear pump is a means for conveying a medium through displacement. The gear pump comprises at least one shaft, which may as well be called first shaft in the following, having a first driving torque. In a preferred embodiment, the gear pump comprises two functionally connected, i.e. interlocked gears with external teeth.

The apparatus further comprises at least one injector for introducing the additive to be admixed into the medium to be pumped. The apparatus further comprises at least one screw conveyor for mixing the above additive with said medium to be pumped. In the following, the at least one screw conveyor may as well be called first screw conveyor. The screw conveyor has a second driving torque. The shaft, or at least one of the shafts, and the screw conveyor, or at least one of the screw conveyors, are functionally thus connected, that the above first and the above second driving torque are coupled.

By means of the above described apparatus, the medium to be pumped is provided with an additive and processed through at least one screw conveyor, such that the additive is homogenously mixed into the medium to be pumped. The above apparatus e.g. can form a block of an extrusion line for producing materials with additives. Examples of such materials with additives can be foamed plastics. One particular product that can be produced by the above described apparatus would be a thermo formable foam sheet as described in EP 1 268 624 B1—WELSH, G. at al.

In a particular embodiment of the present invention, the gear pump comprises two shafts. In a preferred embodiment, the screw conveyors are actually coupled to the shafts of the gear pump. Preferably, the screw conveyors are arranged to extend perpendicular to the direction of extrusion. The screw conveyors are driven by the shafts of the gear pumps.

The driving torque(s) of the screw conveyors is/are coupled to the driving(s) torque of the gear pump shafts.

In another preferred embodiment, the medium to be pumped may be deflected by means of a deflection zone adjacent to the mixing pump, such as to proceed into the screw conveyors. Once having passed the screw conveyors, the medium to be pumped can be deflected by another deflection zone back into the flow direction of the extrusion tool.

In a preferred embodiment of the present invention, at least one of the at least one shafts is a driving shaft. A driving shaft shall be construed as a shaft that is actuated.

In a preferred embodiment, the gear pump comprises a first shaft, which is adapted to operate as a driving shaft, and a second shaft, which is adapted to operate as a non-driving shaft.

In a preferred embodiment, the first shaft is functionally connected with the at least one screw conveyor. Thereby, the first and the second driving torque can be coupled. In the context of the present invention, a functional connection shall be established when a transmission of a force is enabled, in an even more preferred embodiment, the transmission of torque is enabled.

In a preferred embodiment, the apparatus comprises, in addition to the screw conveyor having the second driving torque, a second screw conveyor having a third driving torque.

In a further preferred embodiment, the first screw conveyor is functionally connected with the first shaft, which is a driving shaft of the gear pump, and the second screw conveyor is functionally connected with a second shaft. Preferably, the second shaft may be driven by the gear pump and/or the driving shaft of the gear pump.

In a further preferred embodiment, the apparatus is adapted to provide for a flow direction of the medium to be pumped. In an even more preferred embodiment, the apparatus is adapted to provide a flow direction by means of at least one gear pump.

In a further preferred embodiment, the apparatus is adapted to admix fluid additives into a medium to be pumped Sample additives used as blowing agents for plastics can be butane, pentane, carbon dioxide or nitrogen in fluid stage.

In a particular embodiment of the present invention, the apparatus comprises, in addition to the first gear pump, a second gear pump. Each gear pump of this embodiment is functionally connected with one of the screw conveyors. Preferably, each gear pump is functionally connected by means of a drive shaft for driving the respective screw conveyor with said screw conveyor. Preferably, the extruder speed will be controlled in that way, that the exit pressure at the extruder has reach a certain value to maintain proper filling of the gear pump. With other words: The inlet pressure of the first gear pump can best be controlled by varying the extruder speed.

In a further preferred embodiment, the at least one screw conveyor comprises a multitude of different processing zones. Preferably said screw conveyor comprises at least one mixing zone. Said screw conveyor can even more preferably comprise at least one mixing zone and at least one pressure build up zone. The construction and design of screw conveyors with the adequate geometry to achieve a multitude or different processing zones is known to the skilled artisan.

In a preferred embodiment, the apparatus comprises two screw conveyors, positioned one after another, preferably essentially perpendicular to the flow direction. The screw conveyors are positioned, such that the medium to be pumped passes a first screw conveyor first and a second screw conveyor second. Preferably, the second screw conveyor in the flow direction comprises at least one pressure build up zone.

In a further preferred embodiment, the second screw conveyors driving torque is coupled to the first driving torque. Even more preferably, the second screw conveyor is adapted to be operated by a driving shaft of the gear pump.

In a preferred embodiment, the apparatus comprises an injector that is located upstream of the at least one screw conveyor in respect to flow direction.

In a further preferred embodiment, the at least one screw conveyor further comprises cooling means. Even more preferably, these cooling means are implemented by means of ducts for a coolant medium.

The skilled artisan readily recognises that all of the above embodiments can be implemented singularly or in a combined fashion in an apparatus according to the present invention.

The skilled artisan can readily recognise that the above embodiments can be implemented at other angles too (i.e. not only perpendicular).

The apparatus according to the invention can be used within a device for conveying and extruding a medium. The device comprises a plurality of blocks. It comprises a die block for extruding the medium. Preferably, the die block comprises a die. Upstream of the die block, the device comprises a mixing block. The mixing block comprises an apparatus as previously described. In particular, it comprises an apparatus for admixing additives to a medium to be pumped in any one or combination of the previously described aspects and/or preferred embodiment.

In a preferred embodiment, the device further comprises a transfer block downstream of the miming block. This block can comprise a multitude of distribution blocks/channels adapted to direct a product from a plurality of mixing blocks into one die block, thereby enabling coextrusion.

In a preferred embodiment, the device further comprises an extruder block upstream of said mixing block.

Preferably the above described device and its preferred arrangements is used for admixing a physical blowing agent to a medium, even more preferably to a plastic. In particular, high density foams are produced by the use of a device according to the present invention.

As an example, the operation may be as follows: A medium, preferably a melt, is deflected in a gear pump housing, deflected by deflection channels into a mixing cylinder comprising two conveyor screws.

Downstream, in respect to the flow direction, of the deflection channel, a physical or chemical blowing agent is injected. Mixing zones in the conveyor screws homogenise the medium with the additive. At the terminal, end of the first conveyor screw, a deflection zone deflects the medium to a second conveyor screw. The second conveyor screw further homogenises and/or builds up pressure in the medium.

The conveyor screw rotates due to an extension an example of the functional connection) of the gear pump shaft, which is itself rotating. One of the gear pump shafts is a driving shaft directly actuated by an actuator. It transfers a driving torque to the first conveyor screw and it actuates by means of the gear itself the second gear element with a further, driven shaft that extends to the second conveyor screw. Said second conveyor screw is actuated by said driven shaft.

In a preferred embodiment, torque is transferred by means of a connection bolt. The connection bolt is preferably torsionally stiff, but bending flexible.

The present invention has several advantages that are not provided by incumbent technologies. The advantages may summarized as follows:

- It decouples the extrusion step of the process from the addition and mixing step.
- It minimizes the purging time by adding the additives in the latest downstream point possible, and still obtain proper mixing.
- It allows to operate the extruder without modifications to the extruder barrel.
- It allows to operate with the extruder with an active vent system, even if volatile additives (e.g. foaming agents) are introduced.
- It allows proper introduction and mixing of the additive stream without the need to design, manufacture and install an optimized screw.
- It allows the main stream (e.g. coming from the extruder) and the additive stream to be actively heated or cooled to a desired temperature.
- It allows the main stream and the additive stream to be mixed, and heated or cooled, with minimal pressure loss.
- It can be installed on most existing extrusion systems with minimal additional floorspace requirements, without interfering with the existing set-up and without altering the operational performance.
- It can be applied to extrusion systems, as well as to ram or piston type systems.

The present invention and further embodiments shall be further outlined in the following figures and specific examples without being limited thereto.

FIG. 3 shows a schematic drawing, in an isometric view, of a gear pump shaft and a conveyor screw according to an embodiment of the present invention and their means for.

FIG. 6a shows an alternative device incorporating an apparatus according to an embodiment of the present invention.

FIG. 6d shows an alternative device incorporating an apparatus according to an embodiment of the present invention.

Figure 1:
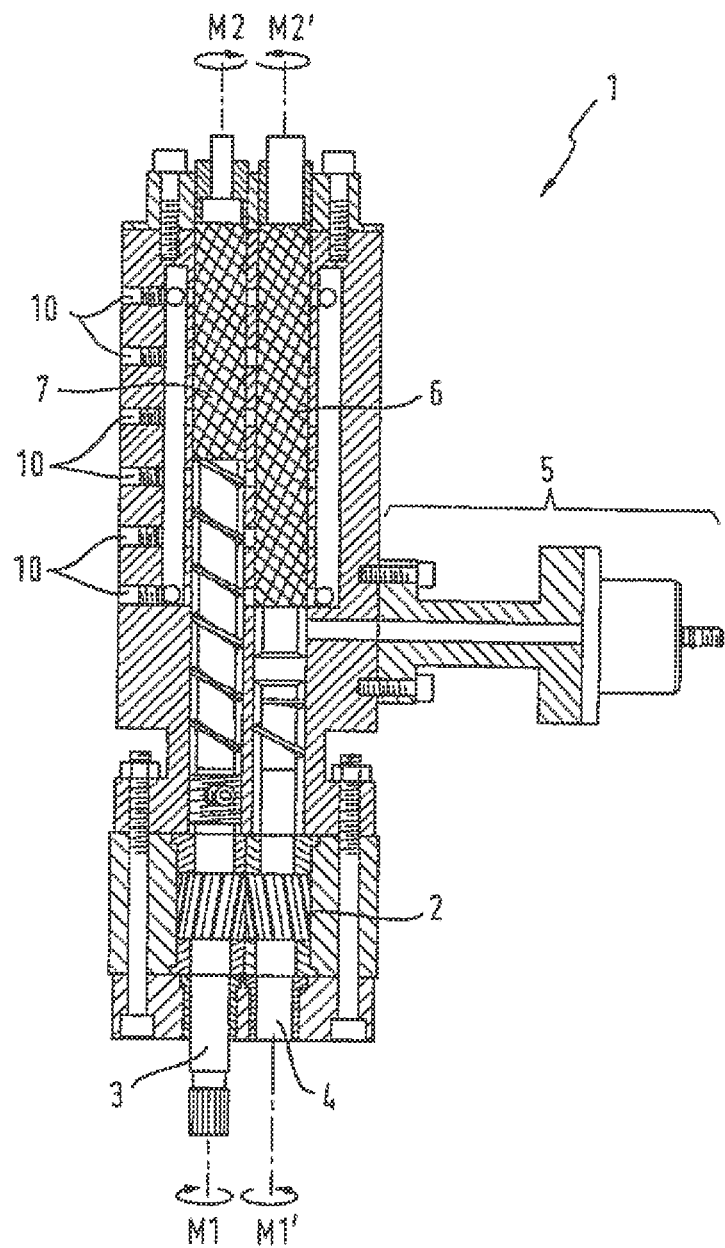
FIG. 1 shows a schematic drawing of an apparatus for admixing additives to a medium to be pumped according to an embodiment the present invention in lateral section.

FIG. 1 is a depiction of an apparatus 1 for admixing additives to a medium to be pumped. The apparatus 1 can be implemented into a typical extrusion line for instance as a mixing block. The apparatus 1 can be further subdivided into three sub-blocks. A gear block houses the gear pump 2. An injector block comprises the injector 5 and a mixing block comprises two mixing screws 6 and 7. The apparatus 1 is shown in a schematic cross section.

During operation, the medium to be pumped would be entering the plane of the cross section from an angle perpendicular to the plane of the cross section. The gear pump 2 would transport the material to be pumped by means of displacement. The gear pump is actuated by an actuator (not shown) which actuates the gear pump 2 by a driving shaft 3 extending through one of the two gears of the gear pump 2. The driving torque of the driving shaft 3 is transferred to the conveyor screw 7 by means of a connection of the conveyor screw 7 with the driving shaft 3. The gear actuated by the driving shaft 3 transfers its driving torque further to the second gear of the gear pump 2 by means of its cogs, thereby resulting into a driving torque M1' for a second shaft 4, which is a non driving shaft or driven shaft 4. Said non driving shaft 4 is connected with a conveyor screw 6, thereby transferring a driving torque M1' to said conveyor screw 6 and resulting in a driving torque M2'. The medium to be pumped is transferred by means of baffles and/or deflection zones (not shown in this figure). Downstream of the gear pump 2, an injector injects a fluid additive, such as for example carbon dioxide, or nitrogen into the medium to be pumped. The conveyor screw 6 dynamically mixes and/or homogenises the mixture of medium to be pumped, most commonly a plastic melt and additive. Alternatively or in addition to a fluid injection, the injector 5 can be adapted to introduce commonly used additives, such as e.g. viscosity enhancers, flame retardants, colorants and/or pigments, cross linking agents, plasticisers, drying agents and/or fillers. Also conceivable is the injection of a plurality and/or combination of additives. A baffle or deflection zone at the end of the first conveyor screw 6 redirects said medium to the second conveyor screw 7, where the medium is further homogenised and/or mixed. As can easily be derived from the picture by a person skilled in the art, the conveyor screws may be equipped with functional zones and with a screw geometry adding in the process as required. Most commonly, the second conveyor screw 7 as depicted is equipped with further pressure build up zone in addition to the mixing/homogenising zones. This ensures that the medium passes the mixing block without loosing too much pressure. Pressure is an important parameter for the extrusion of high density foams, e.g. state of the art extruders for high density foams with carbon dioxide as blowing agents most typically work with a pressure difference $P_D$ of 100 bar at the tool nozzle. The present invention enables a pressure difference at the tool nozzle of 150 bar or more. The conveyor screws keep a pressure of approximately 200 bar of the side of the injection of the blowing agent.

The gear pump thus can be used to increase the pressure in the medium by continuously pumping new medium into the screw. The pressure loss in the conveyor screw 6 and 7 mixing zones can be compensated by additional pressure build up zone on the second conveyor screw 7 in the product flow direction.

With implementation of the present invention in the field of high density foams, a pressure of 200 bar can be achieved for mediums exiting the mixing block into the transfer/feed-block.

For cooling the mixing sub-block, a liquid cooling can be incorporated. Cooling ducts 10 are provided for the coolant medium. It is furthermore conceivable, to cool the gear pump and the conveyor screws separately to achieve optimal cooling in both sub-blocks (not shown).

Figure 2:
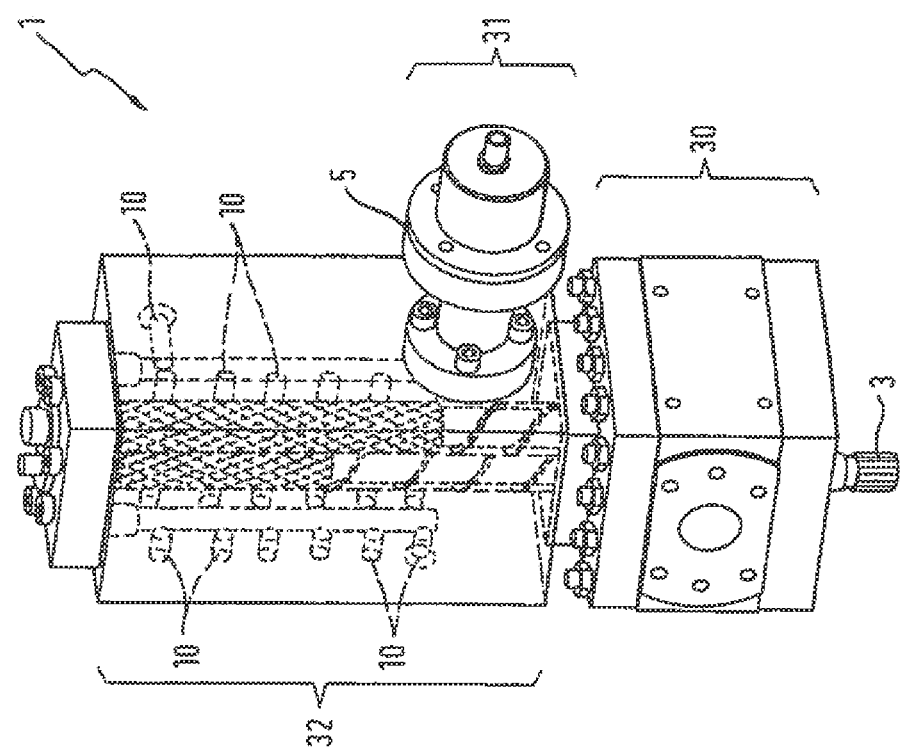
FIG. 2 shows a three-dimensional schematic drawing of an apparatus according to an embodiment the present invention, where some of the elements are omitted for further clarity

FIG. 2 shows a schematic external view of an apparatus mixing block. The apparatus shows the three sub-blocks of the mixing block. The medium to be pumped enters the mixing block in the direction of the indicated arrow. The gear pump housing 30 pumps the medium into the mixing housing 32, where the above described arrangement of conveyor screws mixes and homogenises the medium with an additive that is injected by the injector block 31. This depiction further shows the cooling dockets 10 and an extension of the driving shaft 3 that can be connected with en actuator.

Figure 3:
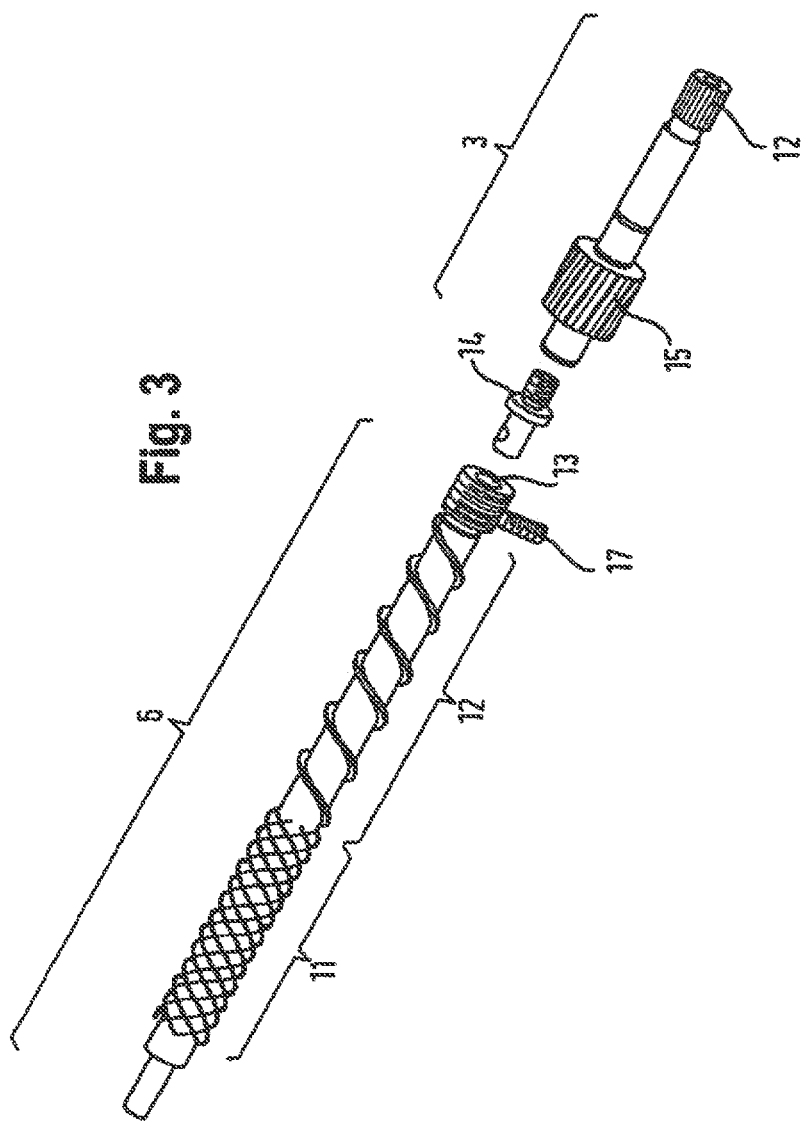

FIG. 3 is an isometric schematic depiction of a shaft 3 and conveyor screw 7. The driving shaft 3 can be subdivided into a pumping gear cog 15 and an actuator cog 16. At the distal end, opposite to the actuator cog 16, the shaft 3 is equipped with a screw ending where a connection bowl 14 can be fitted. The connection bowl 14 fits into a labyrinth seal 13 of a conveyor screw 7. A fixing pin 17 secures the connection between the driving shaft 3 and the conveyor screw 7. The conveyor screw 7 is further subdivided into a homogenization zone 11 and a pressure build-up zone 12.

Figure 4:
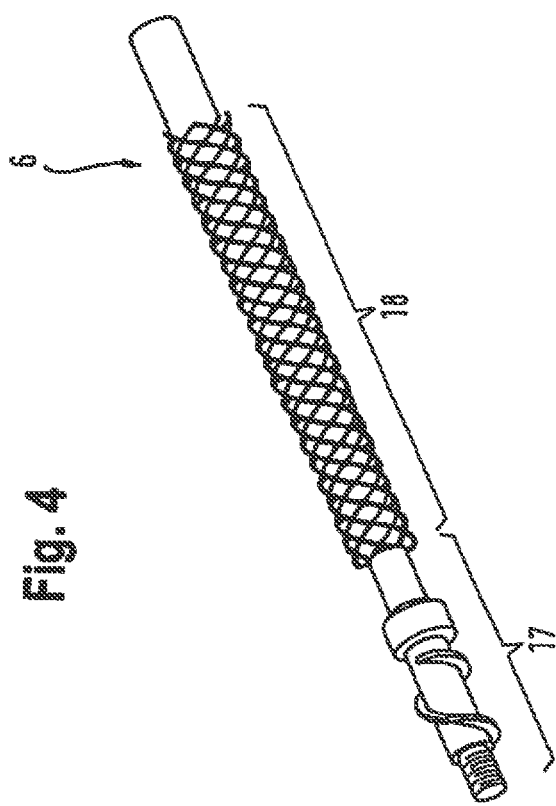
FIG. 4 is a schematic isometric drawing of a conveyor screw as used in an apparatus according to an embodiment the present invention.

FIG. 4 shows an alternate set up for a conveyor screw 7 including homogenization zone 1 and conveying element 18 including a blister ring.

Figure 5:
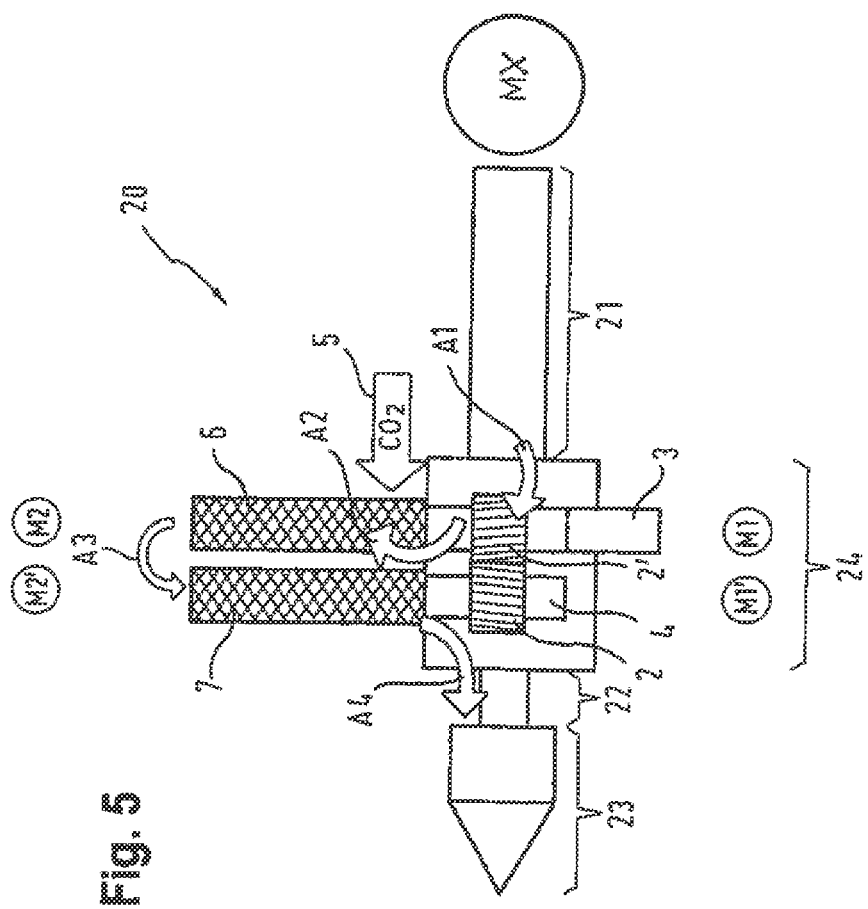
FIG. 5 is a schematic representation of a device incorporating an apparatus according to an embodiment of the present invention.

FIG. 5 is a schematic representation of the extrusion process. An extruder 21 pumps the medium to be pumped with help of a driving torque MX into a mixing block 24. The medium to be pumped enters A1 the gear 2, 2' and in pumped A2 by displacement into a conveyor screw 6 where it is injected with an additive. A deflection baffle deflects A3 the medium into a second conveyor screw 7, directing the medium back to the gear pump housing and therefrom a into a feeding block and extrusion die nuzzle 23.

The shaft 3 actuating the gear pump 2 by rotating the gear cock 2' has a driving torque M1 transferred by means of the cock 2' to the cock 2 resulting in a driving torque M1'. The driving torques M1 and M1' of the gear pump are coupled with the driving torque of the conveyor screws M2, M2'.

FIG. 6*a* shows an alternate design to the net up of FIG. 5. FIG. 6*a* differs in that the extruder feeds a non-actuated gear 2' of the gear pump first and, therefrom into the conveyor screw 6. A deflection zone A3 deflects the medium to a second conveyor screw 7 by means of actuation by a second gear pump A4 back into said second gear pump and therefrom into the feeding block 22 and extrusion nozzle 23. The mixing block 24 of this embodiment has two separate gear pumps, each with an individual driving shaft. The first gear pump couples a driving torque M1 with the conveyor screw 6, the second gear pump couples an independent driving torque M2 with the conveyor screw 7.

Figure 6B:
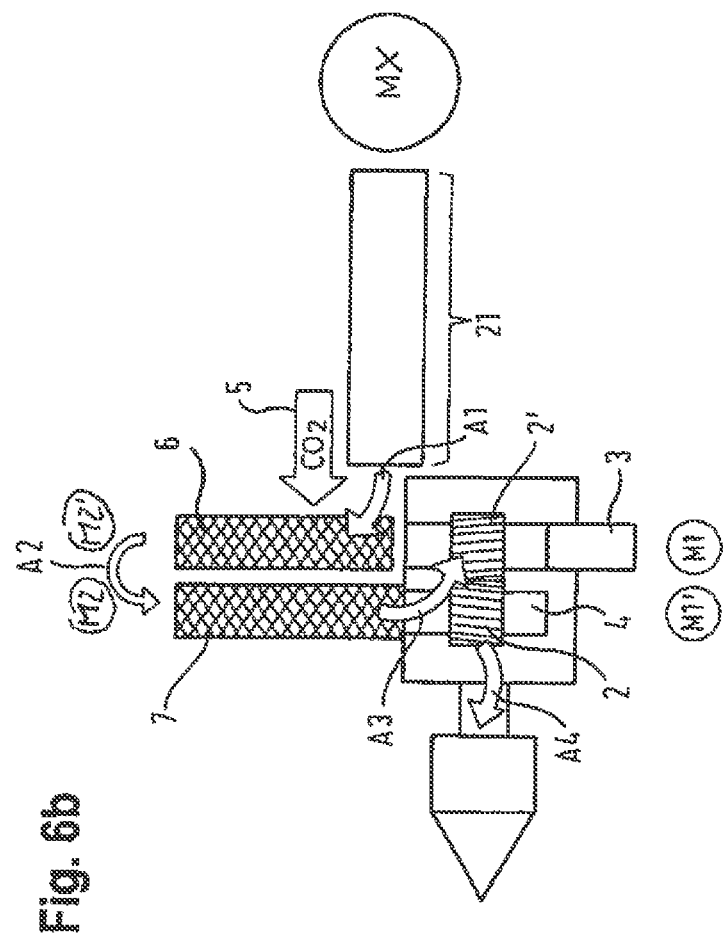
FIG. 6b shows an alternative device incorporating an apparatus according to an embodiment of the present invention.
Figure 6C:
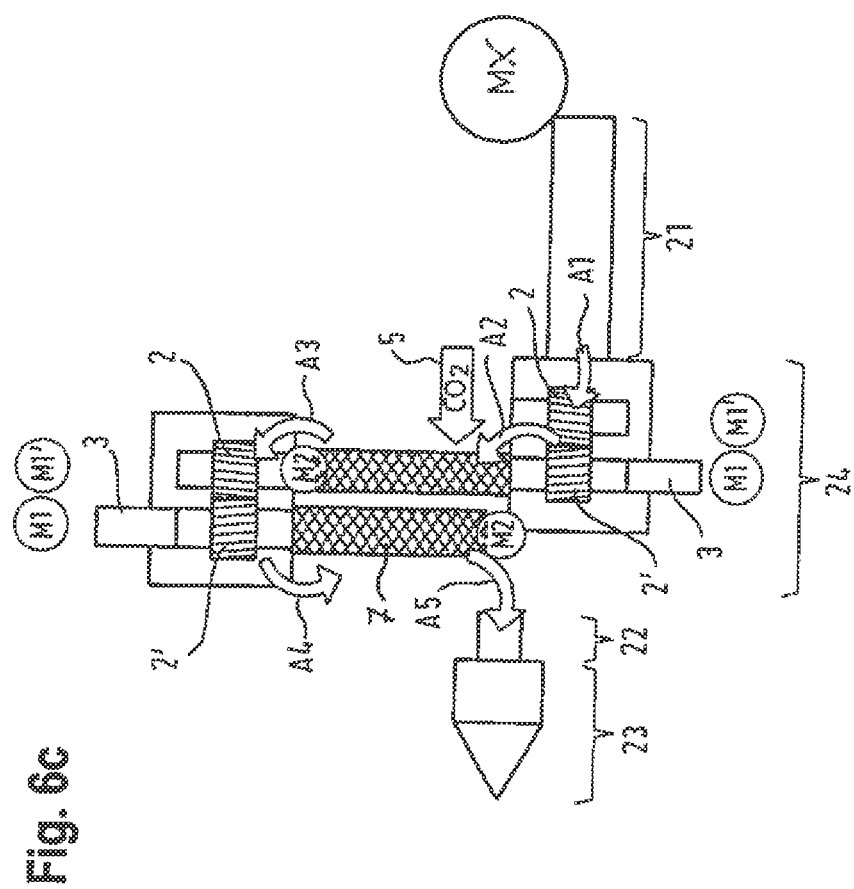
FIG. 6c shows an alternative device incorporating an apparatus according to an embodiment of the present invention.

FIG. 6*b* differs from FIG. 5 in that the extruder feeds directly into the conveyor screw 6. The injection 5 is downstream from the extruder 21. The second conveyor screw 7 feeds the gear pump 2'/2 for pressure build up and therefrom into the extrusion tool.

The driving torque M1 of the driving shaft 3 is transferred first by means of the gear pump cog system to the gear 2 therefrom to the non drive shaft 4 which is coupled with the conveyor screw 7 thereby result in a coupled driving torque M2.

FIG. 5*c* shows a further alternate embodiment to the set up of FIG. 5. The extruder 21 first feeds a gear pump 22'. Downstream of the gear pump the medium to be pumped is added with the additive. The conveyor screw feeds a second gear pump 2,2', which again feeds a second conveyor screw 7. Both conveyor screws have a driving torque M2 coupled to a driving torque of a driving shaft of the gear pump 2'.

FIG. 6*d* shows an alternate embodiment of the set up of FIG. 5. The extruder 21 feeds a first mixing screw 6. Downstream of the extruder, the injection 5 takes place. The first mixing screw 6 feeds the gear pump 2', 2 and the gear pump feeds the second mixing screw 7, which builds up pressure and directly feed the extrusion tool.

Figure 7:
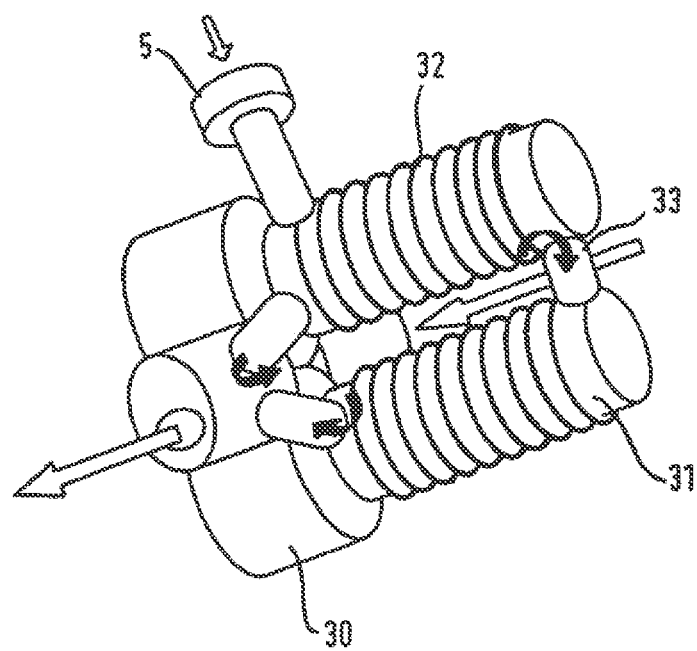
FIG. 7 shows a schematic drawing of a device in isometric view according to an embodiment of the present invention with further illustration of the medium flow direction.

A sample set up for the deflection zone and the various sub-blocks of the apparatus, can be seen in FIG. 7. The apparatus 1 can be subdivided roughly into a pumping sub-block 30, a mixing sub lock comprising two mixing screws 31, 32 (this depiction shows the outside with the status surrounding the screws). Deflection zones 33 ensure that the medium passes from one to the other element. An injection block 5 is responsible for injecting additives into the medium.

With the herein presented apparatus, a dynamic mixing of additives with a medium becomes possible, that prevents loss of pressure through the dynamic mixing. The device can further be installed in a space and cost efficient manner. The possibility to provide conveyor screws with varying geometries allows a person of ordinary skill in the art, to have a specialised tool for varying need in combination of medium and additive.

The invention claimed is:

1. An apparatus comprising at least one gear pump for pumping a medium to be pumped, said gear pump comprising at least one shaft having a first driving torque; at least one injector for introducing an additive into the medium to be pumped; at least one screw conveyor, a first screw conveyor, for mixing said additive with said medium to be pumped, the first screw conveyor having a second driving torque, and, wherein the shaft and the first screw conveyor are functionally connected, such that the first driving torque and the second driving torque are coupled, a second screw conveyor having a third driving torque, wherein the first screw conveyor is functionally connected with the at least one shaft which is a driving shaft of the gear pump and the second screw conveyor is functionally connected with a second shaft which is a driven shaft.

2. An apparatus according to claim 1, wherein at least one of the at least one shaft is a driving shaft.

3. An apparatus according to claim 1, wherein the at least one shaft of the gear pump is adapted to operate as a driving shaft and the gear pump comprises the second shaft which is adapted to operate as the driven shaft.

4. An apparatus according to claim 1, wherein the apparatus is adapted to mix fluid additives into the medium to be pumped.

5. An apparatus according claim 1, wherein the apparatus includes a second gear pump, each gear pump being functionally connected with a screw conveyor.

6. An apparatus according to claim 5 wherein each gear pump is functionally connected with a screw conveyor by means of a drive shaft for driving the respective screw conveyor.

7. An apparatus according to claim 1, wherein the at least one screw conveyor comprises at least one mixing zone and at least one pressure build up zone.

8. An apparatus according to claim 1, wherein the apparatus comprises two screw conveyors positioned one after another in a flow direction (A), such that the medium to be pumped passes the first screw conveyor first and the second screw conveyor second.

9. An apparatus according to claim 8, wherein the second screw conveyor's driving torque is coupled to the first driving torque.

10. An apparatus according to claim 9 wherein the second screw conveyor is adapted to be operated by the at least one shaft of the gear pump.

11. An apparatus according to claim 8 wherein the second screw conveyor in the flow direction (A) comprises a pressure build up zone.

12. An apparatus according to claim 1, wherein the injector is located upstream of the at least one screw conveyor.

13. An apparatus according to claim 1, wherein the at least one gear pump and/or the at least one screw conveyor further comprise cooling means.

14. An apparatus according to claim 13 wherein the cooling means comprises ducts for a coolant medium.

15. An apparatus according to claim 1, wherein the screw conveyor keeps a pressure suitable for injection of a blowing agent.

16. An apparatus according to claim 15 wherein the pressure suitable for injection of the blowing agent is 200 bar.

* * * * *